US010025450B1

(12) United States Patent
Lider et al.

(10) Patent No.: US 10,025,450 B1
(45) Date of Patent: Jul. 17, 2018

(54) GENERATING ACTIVITY SUMMARIES

(71) Applicant: Google Inc., Mountain View, CA (US)

(72) Inventors: Brett Rolston Lider, San Francisco, CA (US); Joseph Robert Smarr, Half Moon Bay, CA (US); David Glazer, Woodside, CA (US); Kenneth Norton, San Carlos, CA (US); Anand Agarawala, San Francisco, CA (US)

(73) Assignee: Google LLC, Mountain View, CA (US)

( * ) Notice: Subject to any disclaimer, the term of this patent is extended or adjusted under 35 U.S.C. 154(b) by 419 days.

(21) Appl. No.: 13/857,900

(22) Filed: Apr. 5, 2013

Related U.S. Application Data

(60) Provisional application No. 61/620,960, filed on Apr. 5, 2012, provisional application No. 61/663,347, filed on Jun. 22, 2012, provisional application No. 61/799,058, filed on Mar. 15, 2013.

(51) Int. Cl.
*G06F 3/048* (2013.01)
*G06F 3/0481* (2013.01)

(52) U.S. Cl.
CPC ................................ *G06F 3/0481* (2013.01)

(58) Field of Classification Search
None
See application file for complete search history.

(56) References Cited

U.S. PATENT DOCUMENTS

| 8,041,610 | B1* | 10/2011 | Cirelli | G06Q 30/02 705/14.49 |
| 2007/0173323 | A1* | 7/2007 | Johnson | A63F 13/12 463/42 |
| 2009/0144211 | A1* | 6/2009 | O'Sullivan | G06Q 30/02 706/14 |
| 2010/0063863 | A1* | 3/2010 | Begeja | G06Q 30/0201 705/7.29 |
| 2010/0100952 | A1* | 4/2010 | Sample | H04L 51/066 726/9 |
| 2011/0173198 | A1* | 7/2011 | Malleshaiah | G06F 17/30702 707/737 |
| 2011/0289153 | A1* | 11/2011 | Hull | G06Q 10/107 709/205 |
| 2013/0035975 | A1* | 2/2013 | Cavander | G06Q 30/02 705/7.22 |
| 2013/0044959 | A1* | 2/2013 | Mitchell | G06Q 30/02 382/217 |

(Continued)

*Primary Examiner* — Hua Lu
(74) *Attorney, Agent, or Firm* — Patent Law Works LLP

(57) ABSTRACT

A system and method for generating activity summaries to users of a social network server is disclosed. User activity information is received by a user activity information receiver module. The user activity information is then categorized by a categorization module, which in some implementations, also groups the categorized user activity information in accordance with commonalities identified among the user activity information. The categorized user activity information is ranked according to relevance to the user by the ranking module or according to relevance to the user's contacts. An output generation module 308 determines when the groupings are complete. Activity summaries are then generated by the output generation module. The activity summary includes the categorized user activity information. The activity summary is sent for display on a user device of a user.

24 Claims, 12 Drawing Sheets

(56) References Cited

U.S. PATENT DOCUMENTS

| | | | |
|---|---|---|---|
| 2013/0073972 A1* | 3/2013 | Yung | G06Q 50/01 715/738 |
| 2013/0073995 A1* | 3/2013 | Piantino | G06Q 50/01 715/764 |
| 2013/0178281 A1* | 7/2013 | Ayyar | A63F 13/12 463/30 |
| 2013/0203439 A1* | 8/2013 | Lifshitz | H04W 64/00 455/456.2 |

* cited by examiner

GENERATING ACTIVITY SUMMARIES

CROSS-REFERENCE TO RELATED APPLICATIONS

The present application claims the benefit of U.S. Provisional Patent Application Ser. No. 61/620,960, entitled "Generating Share Suggestions in a Social Network" filed on Apr. 5, 2012, U.S. Provisional Patent Application Ser. No. 61/663,347, entitled "Generating Activity Summaries" filed on Jun. 22, 2012, and U.S. Provisional Patent Application Ser. No. 61/799,058, entitled "Generating Activity Summaries" filed on Mar. 15, 2013, which are all incorporated herein by reference in their entireties.

BACKGROUND

Social networks are becoming an increasingly popular way for people to stay connected. This increasing popularity of social networks has given rise to many social network services that have developed various ways users of the social network can communicate and share information. Users within a social network can send each other messages, monitor other users' activities on a daily basis and share personal information, including personal photographs and videos. Social networking services have provided a great forum for users to remain in close contact despite geographic distance or uncoordinated schedules. Further, the development of other online services that enable the general sharing of information has also increased. The ability for users to share information with others, and view information about others is available in many different venues.

Users of social networks also participate in many online activities, such as watching videos, posting pictures, posting notification of current user information or activity, or sharing location whereabouts. Within such venues of these social networks, users are able determine what information they chose to share and how and to whom that information is shared. Typically, the information may be shared on a social network portal of a user as the user decides to share the information, but the shared information is typically not organized in a meaningful way.

SUMMARY

The present disclosure relates to social networks. In particular, the present disclosure relates to sharing content within social networks. Still more particularly, the present disclosure relates to generating activity summaries in social networks.

In general, one innovative aspect of the subject matter described in this disclosure may be embodied in methods that may include receiving user activity information. The user activity information may include activity information of a user's online activity. The method may further include categorizing the user activity information, generating an activity summary, wherein the activity summary includes the categorized user activity information, and sending the activity summary for display.

These and other implementations may provide one or more of the following features. The method may further include grouping the categorized user activity information in accordance with commonalities. The method may also include determining the beginning of a grouping. The method may also include ranking the grouped user activity information according to relevance to the user and/or user's contacts. Further the method may include determining when the group is complete. The method may also include associating a verb identifier with a user activity and categorizing the user activity information according to the verb identifier. In some implementations, the activity summary includes more than one type of user activity. In some implementations, the method may include allowing the user to share the generating activity summary with other users.

These and other implementations may provide one or more of the following features. According to one innovative aspect of the subject matter described in this disclosure, a computer program product comprises a non-transitory computer readable medium encoding instructions that, in response to execution by a computing device, cause the computing device to perform operations comprising receiving user activity information, categorizing the user activity information, generating an activity summary, wherein the activity summary includes the categorized user activity information and sending the activity summary for display. The user activity information includes activity information of a user's online activity.

These and other implementations may provide one or more of the following features. In some implementations, the instructions of the computer program product may further cause the computing device to further perform grouping categorized user activity information in accordance with commonalities. In some implementations, the instructions of the computer program product may further cause the computing device to further perform ranking the grouped user activity information according to relevance to the user and/or user's contacts. The instructions of the computer program product may further cause the computing device to further perform determining when the group is complete. The instructions of the computer program product may further cause the computing device to further perform associating a verb identifier with a user activity and categorizing the user activity information according to the verb identifier. In some implementations, the instructions of the computer program product may further cause the computing device to further perform allowing the user to share the generating activity summary with other users. In some implementations the activity summary includes more than one type of user activity.

A system for generating activity summaries to users of a social network server is also disclosed. User activity information is received by a user activity information receiver module. The user activity information includes activity information of a user's online activity. The user activity information is then categorized by a categorization module, which in some implementations, also groups the categorized user activity information in accordance with commonalities identified among the user activity information. In some implementations, the categorized user activity information is ranked according to relevance to the user by the ranking module or according to relevance to the user's contacts by the categorization module. An output generation module determines when the groupings are complete. Activity summaries are then generated by the output generation module. The activity summary includes the categorized user activity information. The activity summary is sent for display on a user device of a user.

These and other implementations may provide one or more of the following features. In some implementations, the categorization module further associates a verb identifier with a user activity, and categorizes the user activity information according to the verb identifier. In some implementations, the activity summary generation module allows the user to share the generating activity summary with other users.

These and other implementations may provide one or more of the following advantages. Activity summaries may be generated that summarize a user's online activity. In some implementations, activity summaries may be generated that summarize the user's real-world activity. In some implementations, a mobile application is implemented on a mobile device that is carried by the user, and that application has access to the phone's location, then activity can be directly inferred. These summaries may organize the user's online activity and group them into interesting stories that convey the user's online experiences, which may be helpful in conveying interesting life experiences.

BRIEF DESCRIPTION OF THE DRAWINGS

The implementations are illustrated by way of example, and not by way of limitation in the figures of the accompanying drawings in which like reference numerals are used to refer to similar elements.

DETAILED DESCRIPTION

Figure 1:
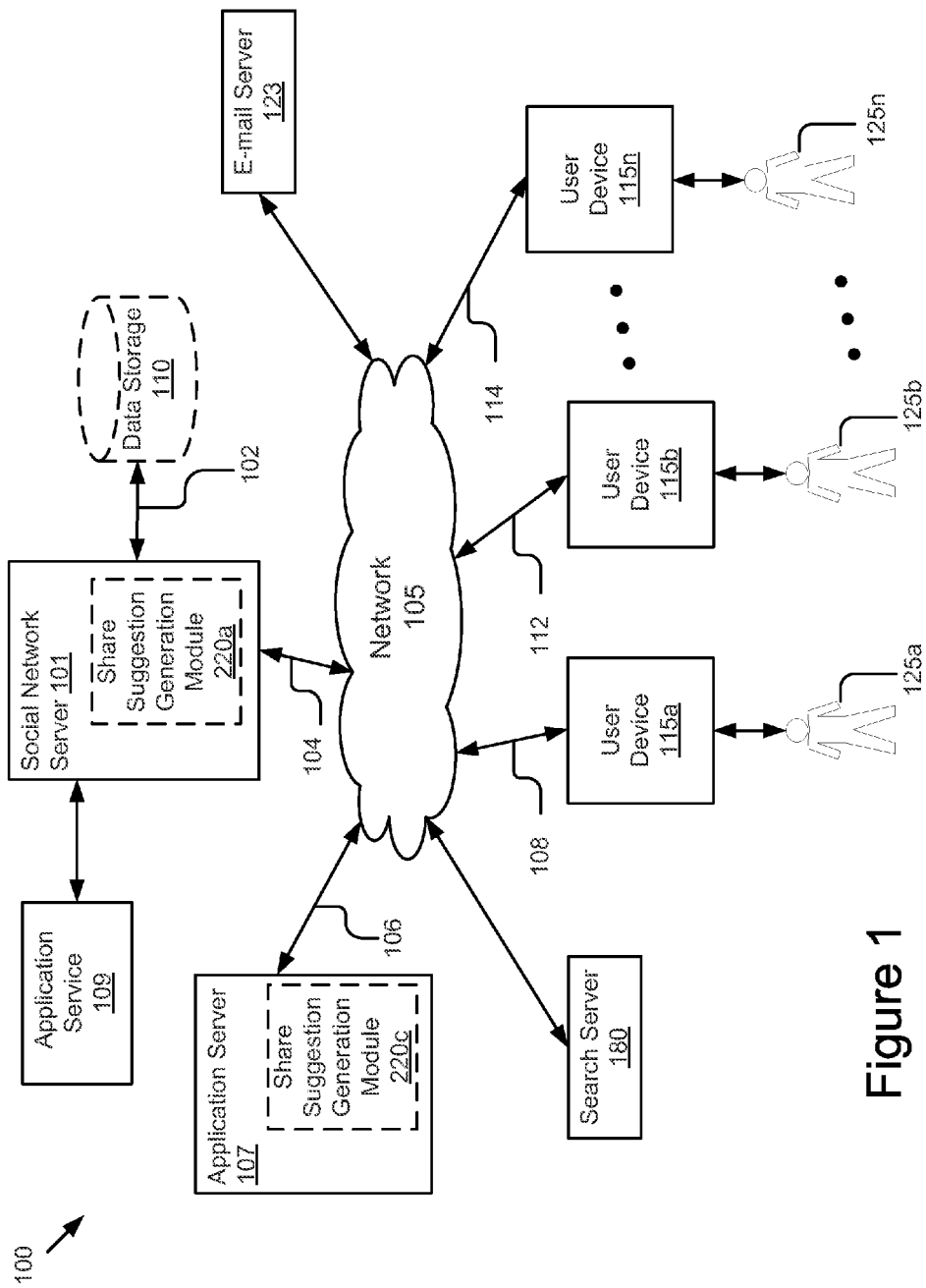
FIG. 1 is a block diagram illustrating an example of a system for generating activity summaries.

A system and method for generating activity summaries is described. An activity summary may be a grouping of user activity information and content that represents the user's online activity. Users perform activity online. Examples of such activity include interacting with content, e.g., watching videos, posting pictures, posting notification of current user information or activity, sharing location whereabouts, or other activity performed online. This activity can be categorized and grouped according to commonality. For example, videos a user watched can be grouped together. As another example, the activity associated with a particular trip the user has taken (pictures taken on the trip, locations identified, or restaurants visited during the trip) may be grouped together. A suggestion to share this grouped activity information is created. This beneficially allows a user to display certain activity information in a way that is more interesting for the user's contacts to view.

In the following description, for purposes of explanation, numerous specific details are set forth in order to provide a thorough understanding of the implementations. It will be apparent, however, that the implementations can be practiced without these specific details. In other instances, structures and devices are shown in block diagram form in order to avoid obscuring the implementations. For example, the present disclosure is described in one implementation below with reference to user interfaces and particular hardware. However, the present disclosure applies to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Furthermore, implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings of the implementations as described herein.

FIG. 1 is a block diagram illustrating an example of a system 100 for generating activity summaries. The illustrated system 100 includes user devices 115a, 115b, and 115n (also referred to collectively as user devices 115 or individually as user device 115) that are accessed by users 125a, 125b, and 125n (also referred to collectively as users 125 or individually as user 125), a social network server 101, a application server 107, an e-mail server 123 and a search server 180. In the illustrated implementation, these entities are communicatively coupled via a network 105. Although only three user devices 115a/115b/115n are illustrated, any number of user devices 115a/115b/115n are available to any number of users 125a/125b/125n.

The illustrated implementations of a system 100 includes user devices 115a, 115b that are accessed by users 125a, 125b, a social network server 101 that is coupled to data storage 110 and an application server 107. In the illustrated implementation, these entities are communicatively coupled via a network 105. The user devices 115a, 115b, 115n in FIG. 1 are used by way of example. While FIG. 1 illustrates three devices, the present disclosure applies to any system architecture having one or more user devices. Furthermore, while only one network 105 is coupled to the user devices, 115a, 115b, 115n the social network server 101 and the application server 107, in practice any number of networks 105 can be connected to the entities.

Although only one social network server 101 is shown, it will be recognized that multiple servers may be present. A social network is any type of social structure where the users are connected by a common feature. Examples include, but are not limited to, blogs, microblogs and Internet forums. The common feature includes friendship, family, a common interest, etc.

The network server 101 may be coupled to the network 105 via signal line 104. The social network server 101 also includes a social network module 209 (as will be shown in FIG. 2). Although only one social network server 101 is shown, persons of ordinary skill in the art will recognize that multiple servers may be present. A social network is any type of social structure where the users are connected by a common feature. The common feature includes relationships/connections, e.g., friendship, family, work, an interest, etc. The common features are provided by one or more social networking systems, such as those included in the system 100, including explicitly-defined relationships and relationships implied by social connections with other online users, where the relationships form a social graph. In some examples, a social graph can reflect a mapping of these users and how they are related. Furthermore, it should be understood that social network server 101 and social network module 209 (FIG. 2) are representative of one social network and that there may be multiple social networks (not shown) coupled to the network 105, each having its own server, application and social graph (not shown). For example, a first social network may be more directed to business networking, a second more directed to or centered on academics, a third is more directed to local business, a fourth directed to dating and others of general interest or a specific focus.

As shown in FIG. 1, social network server 101, may include, among various other modules, an activity summary generation module 220a. More details describing the features and functionalities of these modules will be discussed further below in the detailed description of FIGS. 2 and 3.

A similar module is may be included in the application server 107. As shown in FIG. 1, in some implementations, application server 107 includes an activity summary generation module 220b. For purposes of illustration, the activity summary generation modules 220a/220b will be referred to as activity summary generation module 220 as they have similar functionality and function for a similar purpose.

The application server 107 may include similar components as the social network server 101. Such components as they relate to the social network server 101 are described in the description of FIG. 2. The application server 107 may provide services to users of the system 100. The application server 107 may be a third party application server that hosts other third party websites or third party applications. For example, the application server 107 may host a website for user to listen to music, or may host a website for users to watch videos or play games. The application server 107 is communicatively coupled to send information to the social network server 101 via the network 105. Such information sent to the social network server 101 may be information associated with user activity on the application server 107.

The network 105 enables communications between user devices 115a, 115b, the social network server 101 and the application server 107. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another implementation, the entities can use custom and/or dedicated data communications technologies instead of, or in addition to, the ones described above. Depending upon the implementation, the network 105 can also include links to other networks.

In one implementation, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial—or satellite-based transceivers). In one implementation, the network 105 is an IP-based wide or metropolitan area network.

In the illustrated implementation, the user device 115a is coupled to the network 105 via signal line 108. The user 125a can interact with the user device. The user device 115b is coupled to the network via signal line 112. The user 125b is can interact with the user device 115b as illustrated by signal line 114. The application server 107 is communicatively coupled to the network 105 via signal line 106. The social network server 101 is communicatively coupled to the network 105 via signal line 104. The social network server 101 is also communicatively coupled to data storage 110 via signal line 102.

Data storage 110 may store data and information of users 125a/125b/125n of the system 100. Such stored information includes user profiles and other information identifying the users 125a/125b/125n of the system 100. Examples of information identifying users includes, but is not limited to, the user's name, contact information, relationship status, likes, interests, links, education and employment history, location. The information may be stored in data storage 110 also includes the user's list of current and past friends and the user's activities within the system 100, such as anything the user posts within the system and any messages that the user sends to other users.

Data storage 110 may also store data and information of users 125a/125b/125n of the system 100 receive from the application servers 107. For example, after obtaining user consent, an application server 107 may be a music streaming application or website, which may send information to data storage 110 that identifies the songs or playlists that were listened to by a user.

A user device 115a, 115b, or 115n may be an electronic computing device having a web browser for interacting with the social network server 101 via the network 105 and is used by user 125a, 125b, 125n to access information in the system 100. The user device 115a, 115b, 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto, or any other electronic device capable of accessing a network. A server can also be a computing device.

Figure 2:
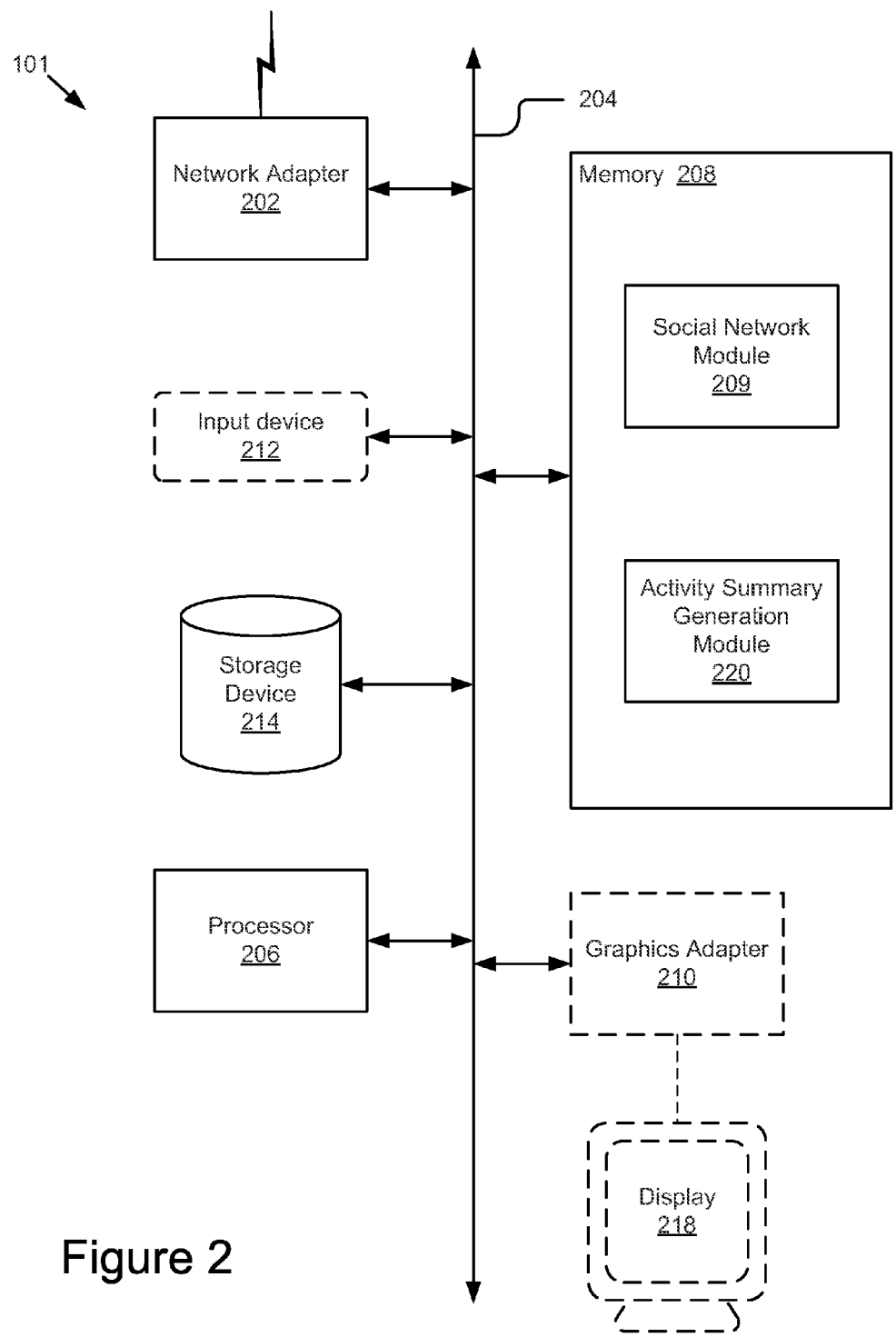
FIG. 2 is a block diagram illustrating an example of a social network server device.

FIG. 2 is a block diagram illustrating an example of a social network server 101. As illustrated in FIG. 2, the social network server 101 includes a network adapter 202 coupled to a bus 204. Also coupled to the bus 204 are at least one processor 206, memory 208, a graphics adapter 210, an input device 212 and a storage device 214. In one implementation, the functionality of the bus 204 is provided by an interconnecting chipset. The social network server 101 also includes a display 218, which is coupled to the graphics adapter 210. As illustrated in FIG. 2, memory 208 includes a social network module 209 and an activity summary generation module 220. The social network server 101 may include or be communicatively coupled to an application service 109. Such application service 109 may provide other online services to users. The application service is communicatively coupled to the social network server 101 and sends information, such as information related to user activity on the application server 109, to the social network server 101. More details describing the functionality and components of the activity summary generation module 220 will be described below in the description for FIG. 3.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the user device 115a/115b. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The user device 115a/115b also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one implementation, the memory 208 also includes a non-volatile memory such as a hard disk drive or flash drive for storing log information on a more permanent basis. The memory 208 is coupled by the bus 204 for communication with the other components of the user device 115a/115b.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device known in the art.

The input device 212 may be a mouse, track ball, or other type of pointing device, and is used in combination with another input device 212, such as a keyboard to input data into the social network server 101. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the social network server 101 to a local or wide area network.

In one implementation, the social network module 209 is software and/or routines executable by a processor to control the interaction between the social network server 101, storage device 214 and the user devices 115a, 115b, 115n. An implementation of the social network module 209 allows users 125a, 125b, 125n of user devices 115a, 115b, 115n to perform social functions between other users 125a, 125b, 125n of user devices 115a, 115b, 115n within the system 100. In some implementations, the social network module 209 may provide the user with an option to opt-in or opt-out of requesting the user activity data from the application server 107 or application service 109.

The activity summary generation module 220 is software and/or routines that, when executed by a processor, generate an activity summary to a user within the system 100. An activity summary may be a grouping of user activity information and content that represents the user's online activity. In some implementations, the activity summary is based on the user's activity online. More details describing the functionality and components of the activity summary generation module 220 will be described below in the description for FIG. 3.

The social network server 101 can have different and/or other components than those shown in FIG. 2. As is known in the art, the social network server 101 is adapted to execute computer program modules for providing functionality described herein. As used herein, the term "module" encompasses it plain and ordinary meaning, including, but not limited to computer program logic utilized to provide the specified functionality. Thus, a module can be implemented in hardware, firmware, and/or software. In one implementation, program modules are stored on the storage device 214, loaded into the memory 208, and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Figure 3:
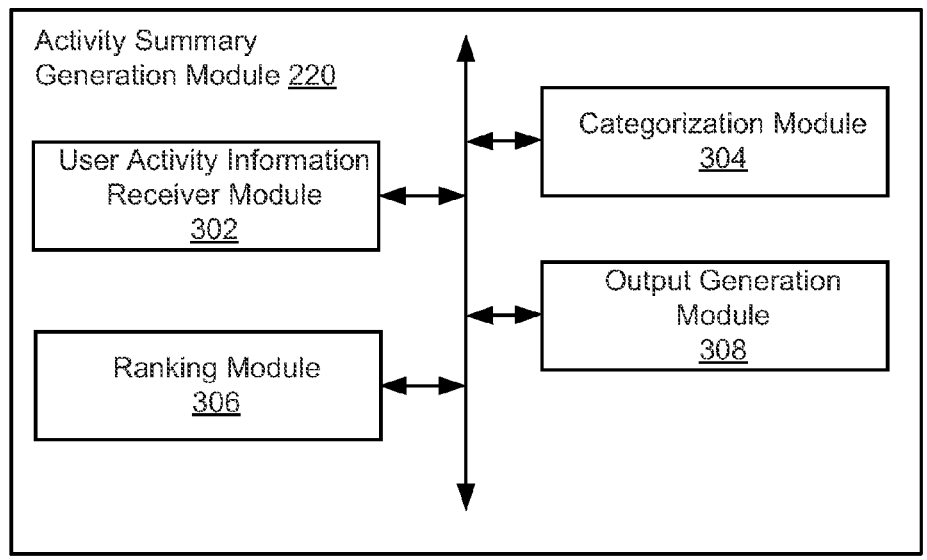
FIG. 3 is a block diagram illustrating an example of an activity summary generation module.

FIG. 3 is a block diagram illustrating examples of modules within the activity summary generation module 220. As stated above, the activity summary generation module 220 may be software and/or routines executable by the processor to generate activity summaries to a user of the system 100. An activity summary may be a grouping of user activity information and content that represents the user's online activity. For example, the activity summary may be a representation of songs that the user has listened to that day. As another example, the activity summary may be a representation or summary of the user's online activity while the user was on vacation. In some implementations, a particular activity may be associated with a specific action and each activity may be different actions. In such implementations, the activity summary may include multiple actions of a user. The activity summary generation module 220 may include a user activity information receiver module 302, a categorization module 304, a ranking module 306 and an output generation module 308. One or more of these modules may be implemented together and are embodied as a single module.

The activity summary generation module 220 may be configured to communicate with user devices 115 to receive input from the user devices 115, application servers 107 and/or application services 109. The activity summary module 220 may be configured to communicate with the user devices 115 to send activity summaries for display on the user devices 115. The input received from the user devices 115, application servers 107 and/or application services 109 may include user activity information, which may be activity that the user has performed online. The user activity information may be information associated with audio (for example, songs) that that user 125 has listened to, pictures that the user has uploaded to the social network server 101, videos that the user has watched, text posts that the user has input into the social network server 101, and other information associated with the activity of the user 125. In some implementations, the activity summary generation module 220 is also configured to communicate with storage device 214 and the data store 110 to send user activity information for storage and retrieval. In some implementations, the activity summary generation module 220 is also configured to communicate with the application server 107 to receive user activity on third party applications.

The user activity information receiver module 302 of the activity summary generation module 220 is software and/or routines for receiving a user activity information from a user device 115 and user activity information stored on storage device 214 or data storage 110. The user activity information receiver module 302 also receives user activity information from application servers 107 and application services 109. The user activity information may be any information associated with the activity of the user when the user is interacting with the application server 107 or application services 109. The user activity information may be information associated with audio (for example, songs) that that user 125 has listened to, pictures that the user has uploaded to the social network server 101, videos that the user has watched, text posts that the user has input into the social network server 101, and other information associated with the activity of the user 125. Additionally, user activity information may be information received from the application server 107 or application service 109 related to user activity on the application server 107 or application service 109. For example, if the application server 107 hosts a website that allows users to listen to music or watch videos, the user activity information regarding songs listened to or videos watch on the application server 107 may be sent to and received by the user activity information receiver module 302 of the activity summary generation module 220.

The request received from the user devices 115 may be a request to view information of a user 125. The request received by the user activity information receiver module 302 may include information identifying the user. The request receiver module is configured to communicate with the association module 304 and sends the information associated with the user 125 to the association module 304.

The categorization module 304 of the activity summary generation module 220 is software and/or routines for categorizing the received user activity information. The user activity information may be categorized or indexed according to various categories or criteria. The user activity information may be categorized according to a user identifier, a verb identifier associated with the user activity, a target associated with the user activity and a source. For example, a user identifier can be anonymized identifier that uniquely identified a particular user 125 of the system 100. The verb identifier associated with the user activity may be predefined according to the particular user activity. In some implementations, if a particular website or a particular application service 109 or application server 107 provides the user with the ability to perform more than one activity on that website, service or server, there may be more than one verb identifier associated with that website, service or server, and each verb identifier may be associated with a certain user activity. For example, if the user activity occurs on a website that hosts videos for viewing, a verb identifier associated with that website and activity may be "watch" or "watched" and the corresponding activity of watching videos that occurs on that website would be associated with "watched." To extend the example, if the website also allows a user to listen to music, the verb associated with that corresponding activity of listening to songs other audio files may be "listen" or "listened." In this example, the website may be associated with various user activities and therefore various corresponding verb identifiers. The target associated with the user activity identifies an item (such as a video in the previous example) that was a target of the user's activity. The target may include a title and a Uniform Resource Locator (ULR) where the target can be found.

The user activity information from multiple servers 107 may have the same associated verb. Similarly, user activity information from multiple application services 109 may have the same associated verb. For example, there may be multiple application servers 107 that allows users to listen to music. For the user activity associated with these application servers 107 the activity would be categorized using the same verb and therefore the activity would be categorized together, for example, under the verb "listened." The categorization module 304 may also group the categorized user activity. For example, the categorization module 304 may aggregate the categorized based on the type of activity.

The categorization module 304 may also group the categorized user activity based on other criteria and these categorized groups may include different types of user activity or content. The categorization module 304 may also group the user activity information in accordance with commonalities identified among the user activity information. By grouping the user activity information in accordance with commonalities identified among the user activity information, the categorization module 304 helps to organize the user activity or online activity into interesting stories or comprehensive summaries of these activities. This categorized and organized user activity represents online experiences and may be helpful in conveying the user's life experiences when the experiences relate to a common theme. The categorization module 304 may group the user activity information based on relatedness (similar topic, similar content, etc.) of the user activity. Commonalities may include a location common to the user activity. Commonalities may also include an interest or topic common to the user activity. Groups of user activity created by the categorization module may therefore include different types of user activity. For example, the categorization module 304 may categorize and group together the user activity that the user performed online while the user was in Japan. Such example categorized and grouped user activity, which eventually becomes output or displayed as the activity summary, may include activity and content such as the pictures the user posted of the user's trip to Japan, the places that the user visited while in Japan, and the items the user purchased online while the user was in Japan.

Further, the grouping and categorization performed by the categorization module may be based on session determination and whether the user activity falls within a particular session. The categorization module 304 may also determine sessions of user activity. The categorization module 304 may determine sessions of user activity based on time the user activity was performed. The time may be based on a certain time frame, for example, every six hours, or based on certain times of the day, for example, from 9:00 AM to 5:00 PM. The categorization module 304 may determine sessions of user activity based on when the user signs off and/or signs in. The sign-on or sign-in may be associated with activity on the application server 107 or application service 109. The session may also be based on other factors, e.g., relatedness of the user activities. For example, relatively continuous user activities that are related to a particular topic or particular type of content can indicate a session.

The ranking module 306 of the activity summary generation module 220 may be software and/or routines for ranking the categorized user activity information. The categorized user activity information may be ranked 406 according to relevance to the user by the ranking module 306. The categorized user activity information may be ranked 406 according to relevance to the user's contacts by the ranking module 306.

Figure 4:
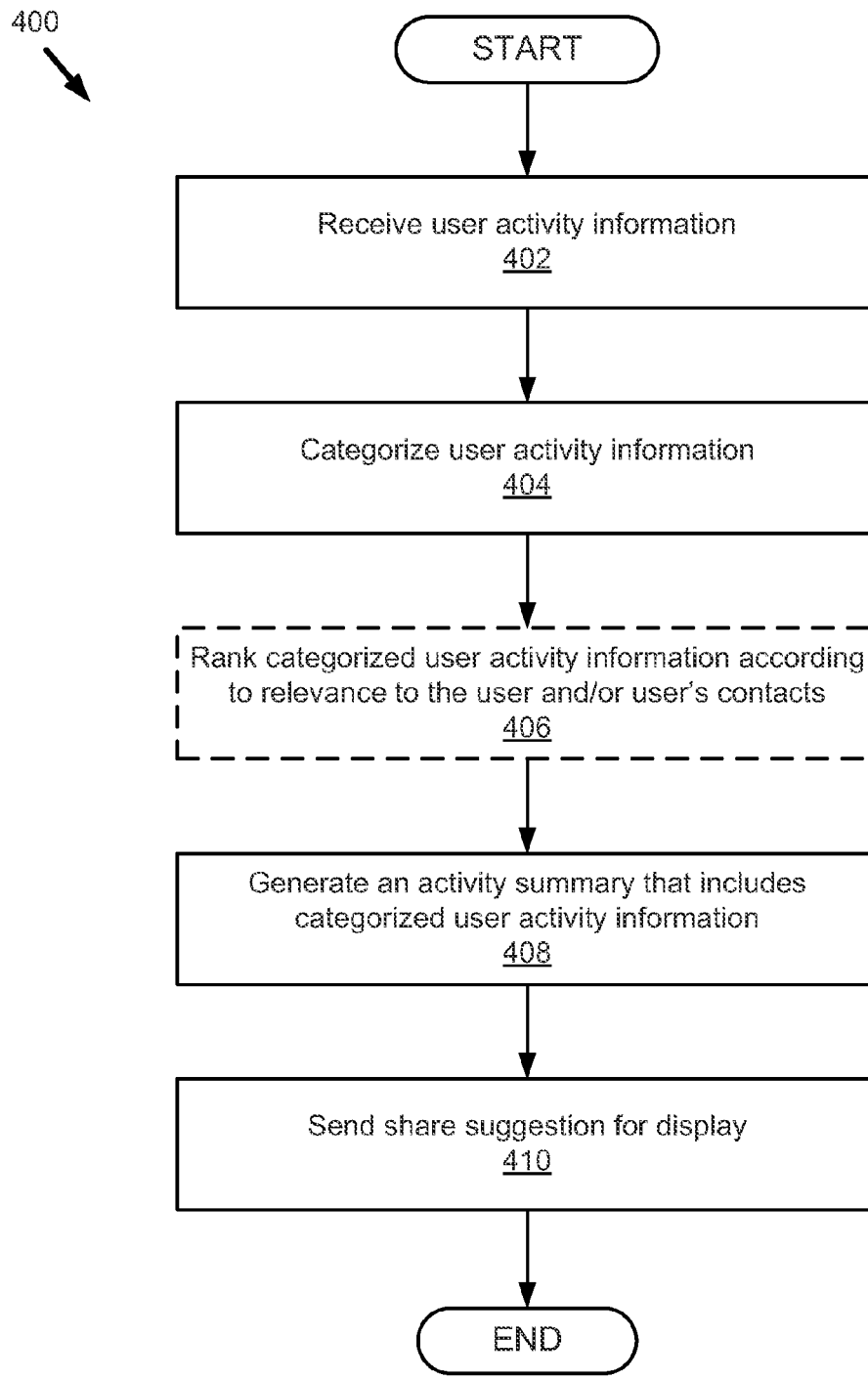
FIG. 4 is a flow chart illustrating an example method for generating activity summaries in a social network.

The output generation module 308 of the activity summary generation module 220 is software and/or routines for generating the activity summaries based on the categorized user activity information. The output generation module 308 receives information from the categorization module 304 and the ranking module 306 and generates activity summaries based on the categorized user activity information. In some implementations, the user may share the generated activity summary with other users, for example, by posting the activity summary on the user's social network portal. The post may be a public post where other users can view the activity summary. The post may also be a private post where selected users may view the activity summary Referring now to FIG. 4, an example method 400 for generating activity summaries to a user 125 of the system 100 will be described. In some implementations, the method 400 is performed by the components of the social network server 101, and specifically, by the components of the activity summary generation module 220. In one implementation, the method 400 begins when user activity information is received 402 by the user activity information receiver module 302. The user activity information is then categorized 404 by the categorization module 304. In some implementations, the categorized user activity information is ranked 406 according to relevance to the user by the ranking module 306. In some implementations, the categorized user activity information is ranked 406 according to relevance to the user's contacts by the ranking module 306. Activity summaries are then generated 408 by the output generation module 308 of the activity summary generation module 220. The activity summary includes the categorized user activity information. The activity summary is sent 410 for display on a user device 115 of a user 125. In some implementations, the user may share the generated activity summary with other users, for example, by posting the activity summary on the user's social network portal. The post may be a public post where other users can view the activity summary. The post may also be a private post where selected users may view the activity summary.

Figure 5:
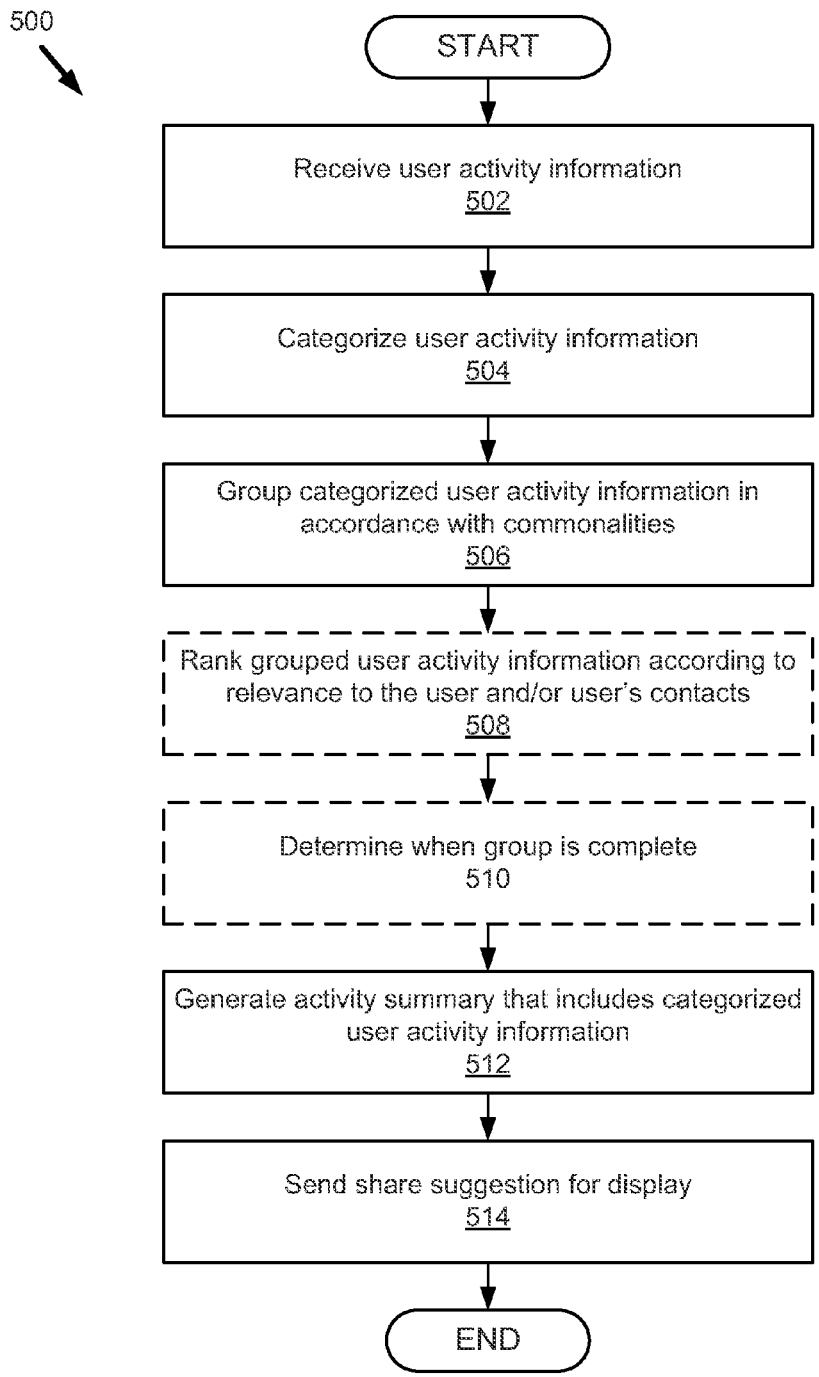
FIG. 5 is a flow chart illustrating an example method for generating activity summaries in a social network.

Referring now to FIG. 5, another example method 500 for generating activity summaries to a user 125 of the system 100 will be described. In some implementations, the method 500 is performed by the components of the social network server 101, and specifically, by the components of the activity summary generation module 220. In one implementation, the method 500 begins when user activity information is received 502 by the user activity information receiver module 302. The user activity information may be information associated with audio (for example, songs) that that user 125 has listened to, pictures that the user has uploaded to the social network server 101, videos that the user has watched, text posts that the user has input into the social network server 101, and other information associated with the activity of the user 125. Additionally, user activity information may be information received from the application server 107 or application service 109 related to user activity on the application server 107 or application service 109. In some implementations, the user activity information may also be photos that the user has taken and location information associated with those photos. In some implementations, the activity information may also include the user's location information (or location information of the user's device), the user's calendar information, or information related to events that the user will be attending or has attended, or other information related to the user's online activity. For example, if the application server 107 hosts a website that allows users to listen to music or watch videos, the user activity information regarding songs listened to or videos watch on the application server 107 may be sent to and received by the user activity information receiver module 302 of the activity summary generation module 220. In one implementation, a user's search history may also serve as a source for activity information.

The user activity information is then categorized 504 by the categorization module 304. In some implementations, the user activity information may be categorized according to a user identifier, a verb identifier associated with the user activity, a target associated with the user activity and a source. For example, a user identifier can be anonymized identifier that uniquely identified a particular user 125 of the system 100. The verb identifier associated with the user activity may be predefined according to the particular user activity. In some implementations, if a particular website or a particular application service 109 or application server 107 provides the user with the ability to perform more than one activity on that website, service or server, there may be more than one verb identifier associated with that website, service or server, and each verb identifier may be associated with a certain user activity. For example, if the user activity occurs on a website that hosts videos for viewing, a verb identifier associated with that website and activity may be "watch" or "watched" and the corresponding activity of watching videos that occurs on that website would be associated with "watched." In some implementations, the user activity information may also be categorized according to The categorization module 304 also groups 506 the categorized user activity information in accordance with commonalities identified among the user activity information. By grouping the user activity information in accordance with commonalities identified among the user activity information, the categorization module 304 helps to organize the user activity or online activity into interesting stories or comprehensive summaries of these activities. This categorized and organized user activity represents online experiences and may be helpful in conveying the user's life experiences when the experiences relate to a common theme. The categorization module 304 may group the The user activity information may be grouped 506 based on relatedness (similar topic, similar content, etc.) of the user activity. Commonalities may include a location common to the user activity. Commonalities may also include an interest or topic common to the user activity. Groups of user activity created by the categorization module may therefore include different types of user activity. For example, the categorization module 304 may categorize and group together the user activity may be categorized 504 and grouped 506 together according to activity that the user performed online while the user was in Japan. Such In this example, categorized and grouped user activity, which eventually becomes output or displayed as the activity summary, may include activity and content such as the pictures the user posted of the user's trip to Japan, the places that the user visited while in Japan, and the items the user purchased online while the user was in Japan.

In some implementations, the categorization module 304 also groups 506 the categorized user activity information in accordance with commonalities identified among the user activity information to determine the beginning of a specific group in order to create a story from that grouping. In one implementation, a change in a user's location signals the beginning of a story. In one implementation, new photos signal the beginning of a story.

In some implementations, the categorized user activity information is ranked 508 according to relevance to the user by the ranking module 306. In some implementations, the categorized user activity information is ranked 508 according to relevance to the user's contacts by the ranking module 306.

The output generation module 308 determines 510 when the groupings are complete. Certain signals or activity information are monitored and analyzed to determine the completion of a grouping or ending of a story. Specifically, certain signals such as photos, location, calendar, events and other user's information (which is linked to the first user) serve as sources for activity information and indications of the completion of a grouping or ending of a story. In one implementation, a user's search history may also serve as a source for activity information. In one implementation, a change in a user's location signals the ending of a story. In one implementation, a time limit may signal the ending of a story.

Activity summaries are then generated 512 by the output generation module 308 of the activity summary generation module 220. In some implementations, a notification that activity information is being collected and categorized is generated. In such implementations, such notifications may include a notification that a story is being created. In other implementations, a notification of the completed version activity summary is generated. The activity summary includes the categorized user activity information. The activity summary or notification is sent 514 for display on a user device 115 of a user 125. In some implementations, the user may share the generated activity summary with other users, for example, by posting the activity summary on the user's social network portal. The post may be a public post where other users can view the activity summary. The post may also be a private post where selected users may view the activity summary.

Figure 6:
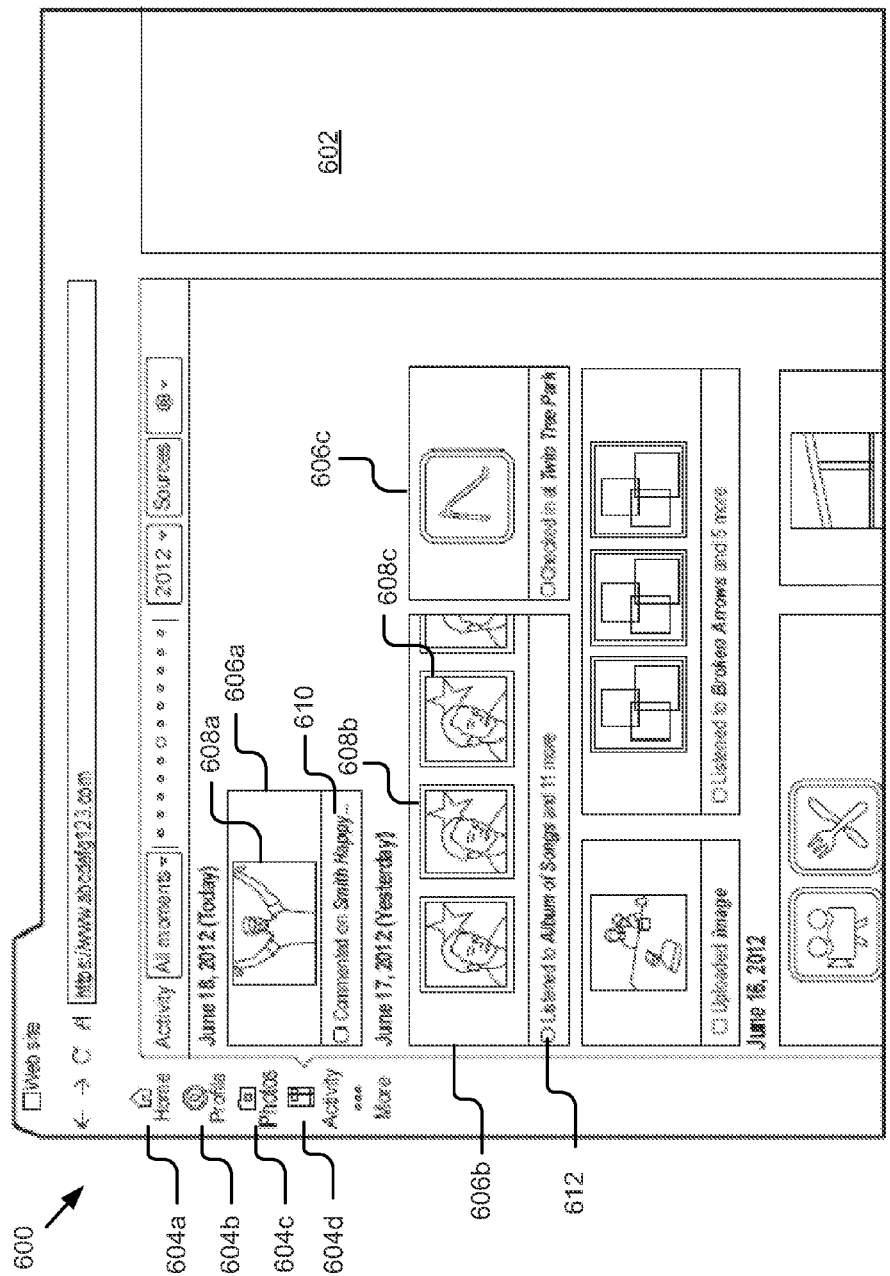
FIG. 6 is a graphic representation of an example user interface of a social network portal displaying activity summaries for a user.

FIG. 6 is a graphic representation of an example user interface 600 of a social network portal 602 displaying activity summaries for a user. In some implementations, the user interface 600 is an independent application that generates activity summaries and provides an option for sharing the activity summaries with a user's contact, for example, via e-mail, a link via SMS, or directly to a social network. The social network portal 602 includes various sections accessible by icons 604*a*, 604*b*, 604*c*. In this graphic representation of an example user interface 600, activity summaries 604*a*, 604*b*, 604*c* are displayed in the users' Activity section. The user interface 600 includes activity summaries 606*a*, 606*b*, 606*c*. Each activity summary 606*a*, 606*b*, 606*c* may include one or more graphic representations 608*a* of user activity. Each activity summary 606*a*, 606*b*, 606*c* may also include activity description 610 and content indicating what activity was performed.

As illustrated in this representation, user activity is organized and grouped by type of activity (verb) and displayed accordingly. In this example, the activity summaries 606*a*, 606*b*, 606*c* also include checkbox 612 that may be used to allow the sharing or display of the information in the activity summary 606*a*, 606*b*, 606*c* to other users. In other examples, another equivalent mechanism may provide this capability.

Figure 7:
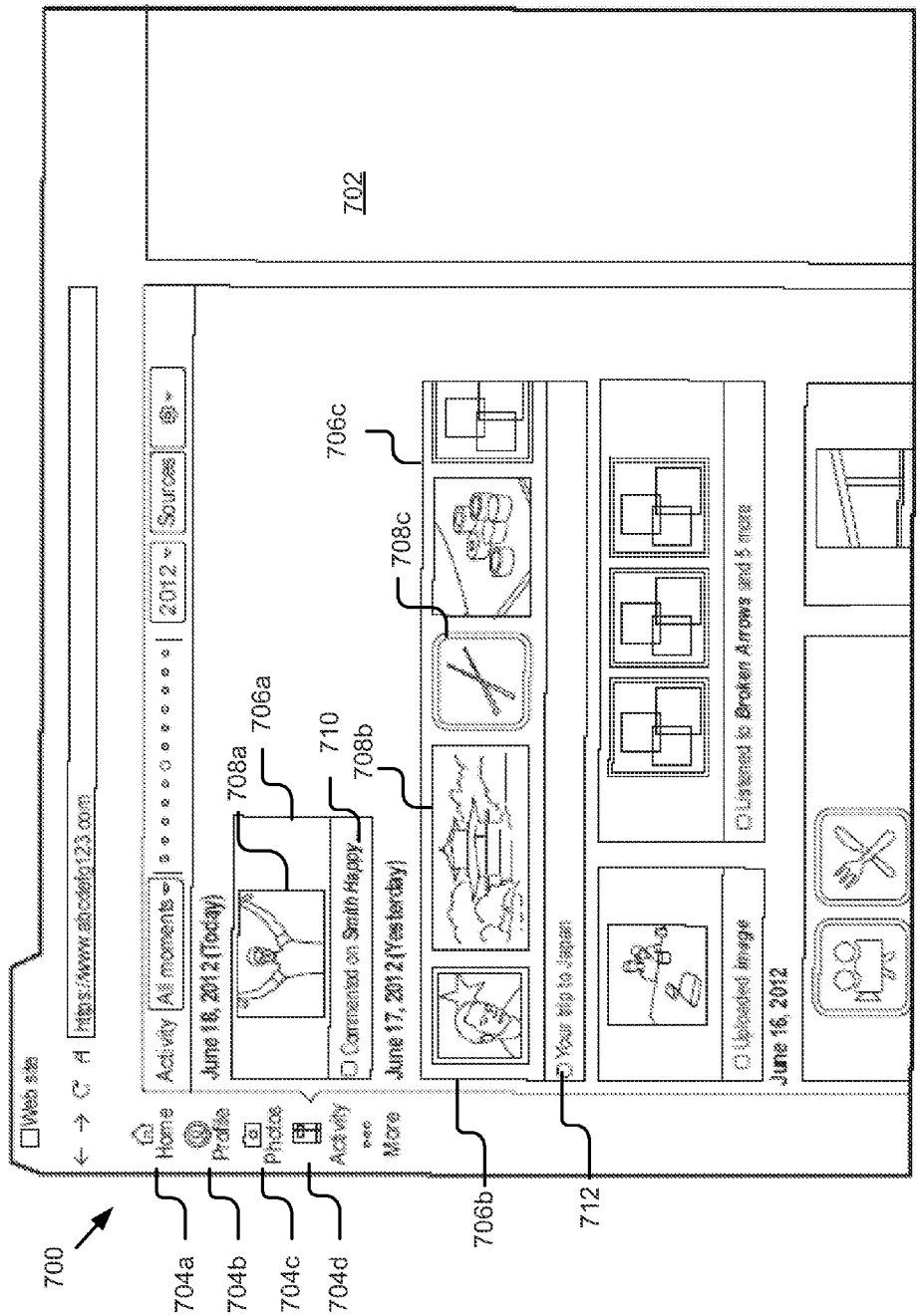
FIG. 7 is a graphic representation of another example user interface of a social network portal displaying activity summaries for a user.

FIG. 7 is a graphic representation of another example user interface 700 of a social network portal 702 displaying activity summaries for a user. Similar to the example in FIG. 6, the social network portal 702 includes various sections accessible by icons 704*a*, 704*b*, 704*c*. In this graphic representation of an example user interface 700, activity summaries 704*a*, 704*b*, 704*c* are displayed in the users' Activity section. The user interface 700 includes activity summaries 706*a*, 706*b*, 706*c*. Each activity summary 706*a*, 706*b*, 706*c* may include one or more graphic representations 708*a* of user activity. Each activity summary 706*a*, 706*b*, 706*c* may also include activity description 710.

As illustrated in this representation, in activity summary 706*c*, user activity is organized and grouped by relatedness or commonality and displayed accordingly. In this example, activity summary 706*c* includes graphic representations 708*b* and 708*c* of different types of user activity that are related by a certain topic. The activity summaries 706*a*, 706*b*, 706*c* also include checkbox 712 that may be used to allow the sharing or display of the information in the activity summary 706*a*, 706*b*, 706*c* to other users. In other examples, another equivalent mechanism may provide this capability.

Figure 8:
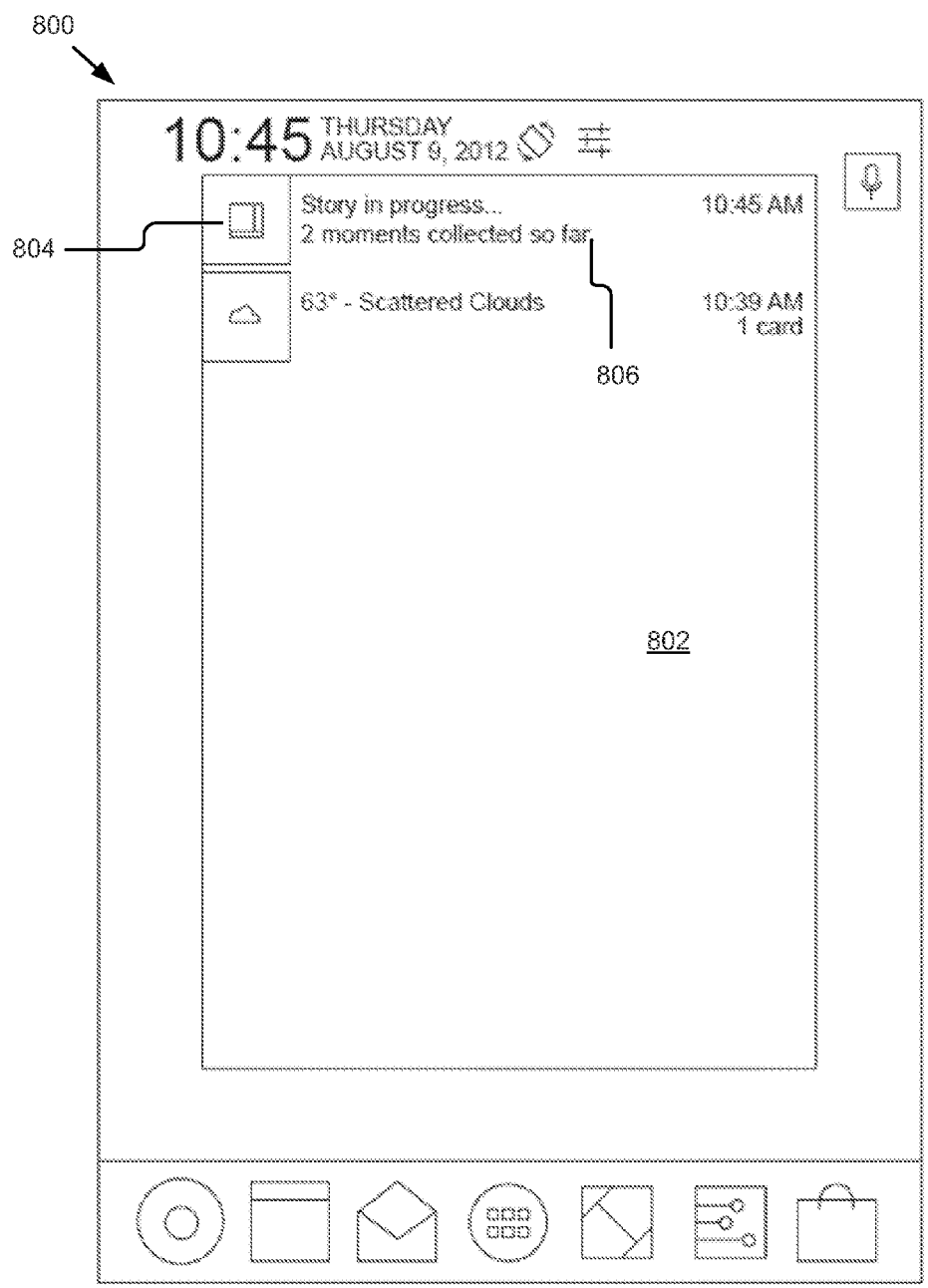
FIG. 8 is a graphic representation of an example user interface of a social network portal displaying initial generation of an activity summary.

FIG. 8 is a graphic representation of an example user interface 800 of a social network portal 802 displaying initial generation of an activity summary. As explained in the descripted regarding FIG. 6, the example user interface 800 may display an independent application for generating an activity summary of a user. In some implementations, the user interface 800 is displayed on the client device, which may be a mobile phone or other mobile device. In this example, a user may have started to take photos or started on a car ride. The system may receive this new activity information (new photos being uploaded or change in the user's location) and begin receiving and categorizing the activity information. As illustrated in FIG. 8, the social network portal 802 includes a story initiation notification 804, which displays progress information 806. As seen in this example user interface, the system has detected the beginning of a story based on the activity information that was collected and has generated a notification of the initiation of the story. As also seen in FIG. 8, the user interface 800 displays a status indicating that the story is in progress. Based on various information being received, the system may detect that the story is still in process and has not yet ended. For example, the system may have information regarding a location that a user visits regularly as part of their daily routine and may detect location information of the device, and determine that the user is not at that location and thus determine that a story is still being developed and continue to collect user activity information to aggregate and summarize.

Figure 9:
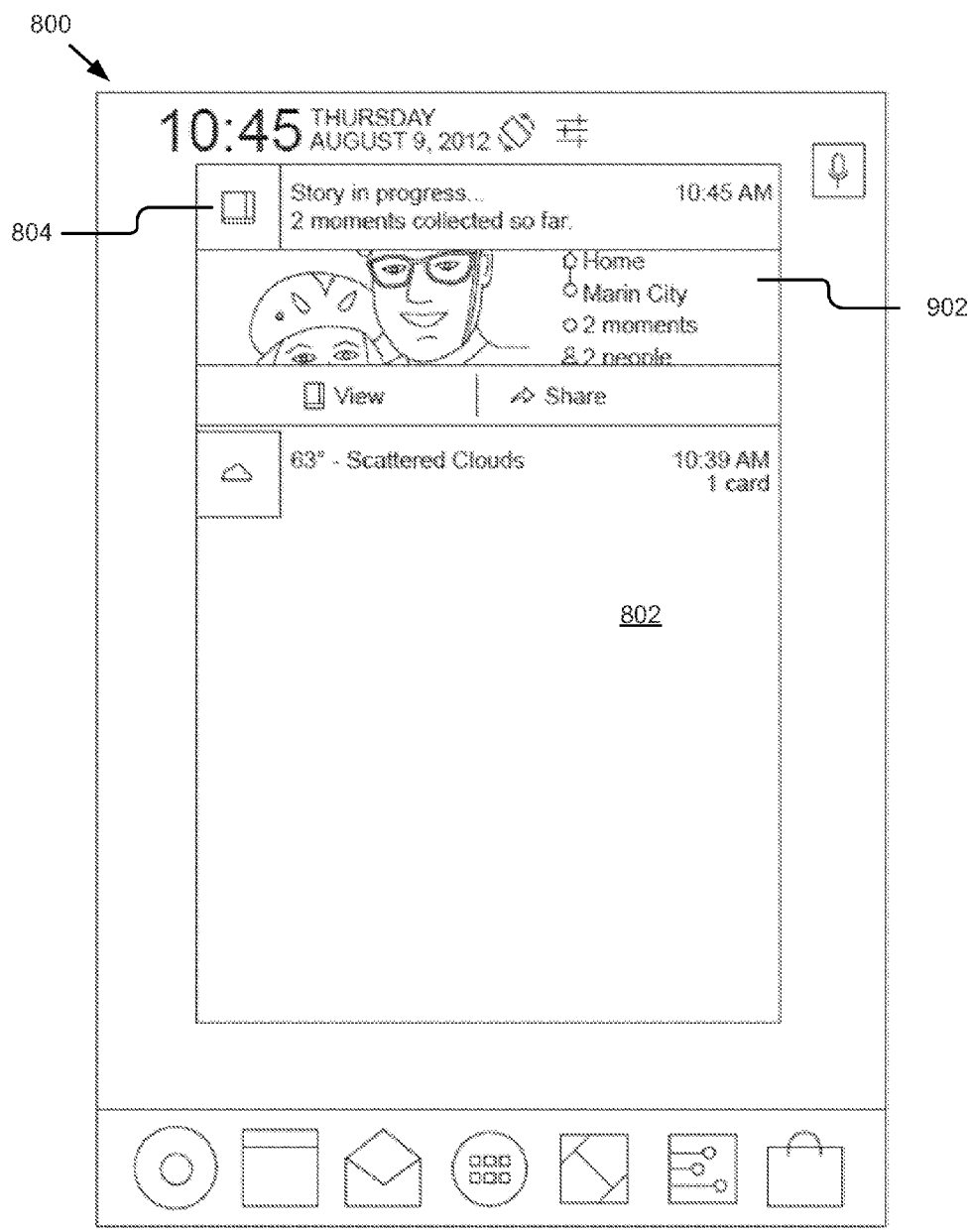
FIG. 9 is a graphic representation of an example user interface of a social network portal displaying initial generation of an activity summary.
Figure 10:
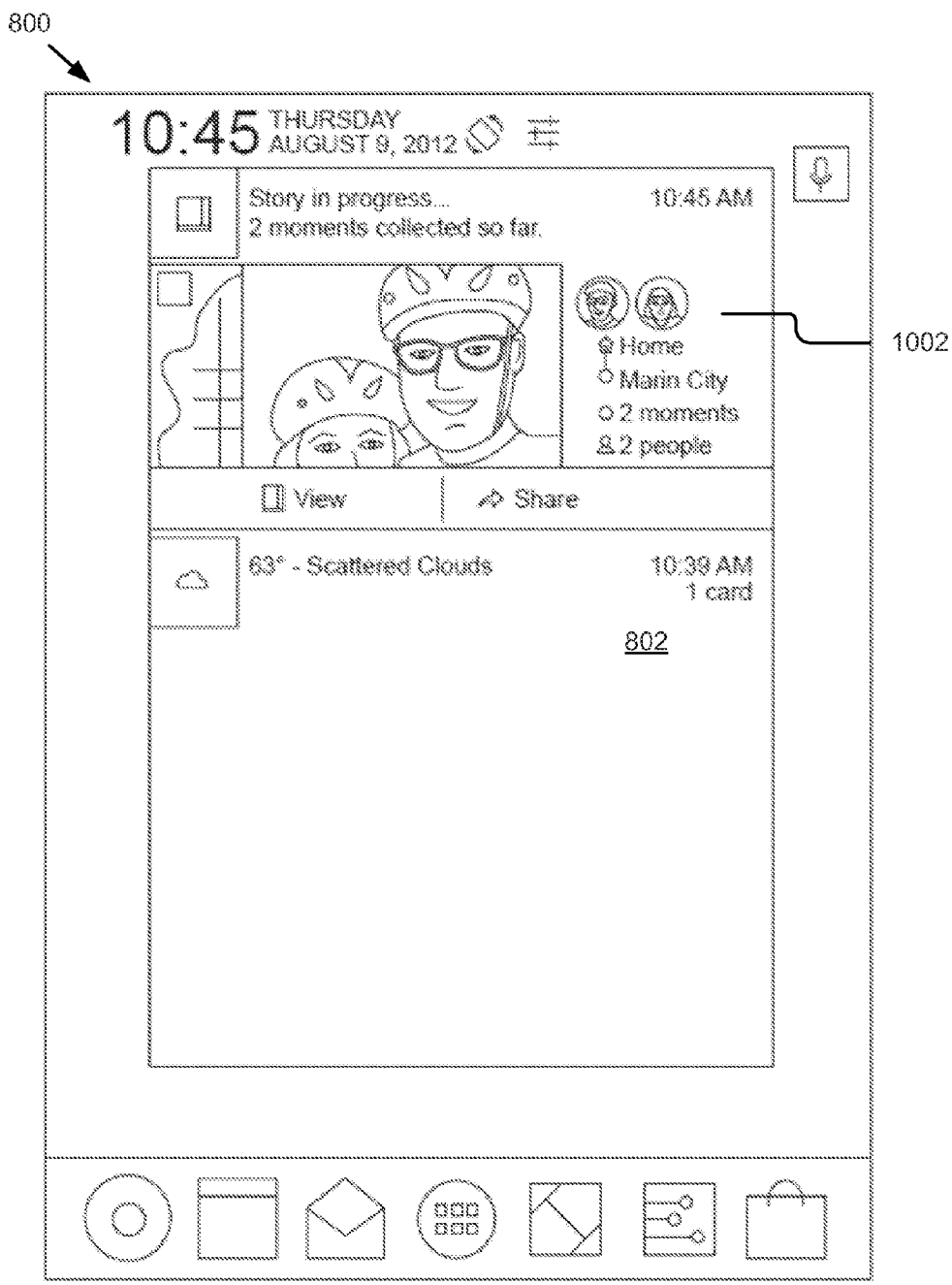
FIG. 10 is a graphic representation of an example user interface of a social network portal displaying initial generation of an activity summary.

FIG. 9 is a graphic representation of the example user interface 800 of the social network portal 802 displaying another version of the initial generation of an activity summary. As illustrated in FIG. 9, the social network portal 802 includes a story initiation notification 804. In the example shown in FIG. 9, the story initiation notification 804 includes progress information 902. Another example of this user interface 800 is illustrated in FIG. 10. FIG. 10 shows the social network portal 802, which includes the story initiation notification 804. As illustrated in FIG. 10, more of the story is being created, which is displayed in progress information 1002.

Figure 11:
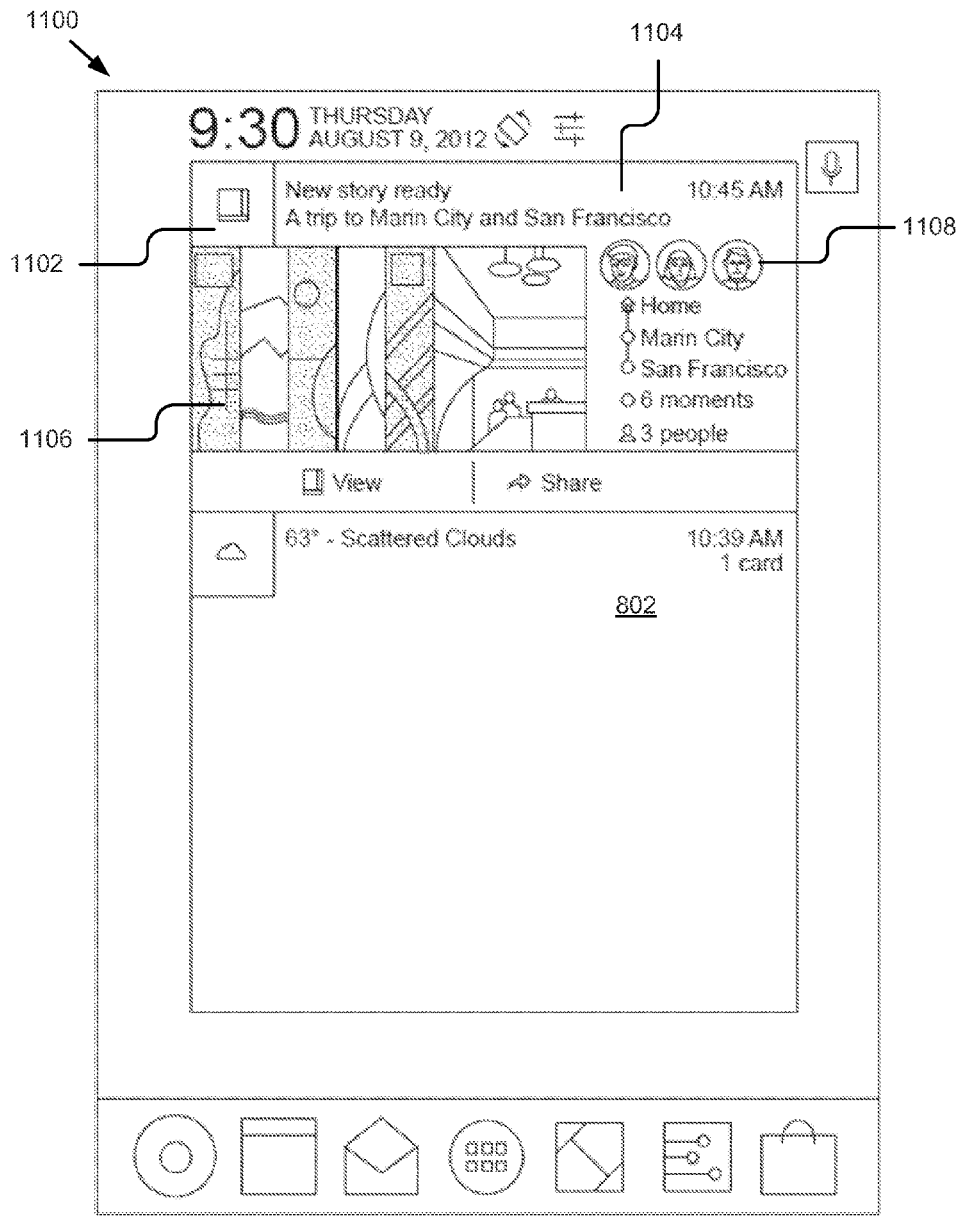
FIG. 11 is a graphic representation of an example user interface of a social network portal displaying a notification of an activity summary.

FIG. 11 is a graphic representation of an example user interface 1100 of the social network portal 802 displaying a notification 1102 of an activity summary. In some implementations, a particular activity may be associated with a specific action and each activity may be different actions. As illustrated in FIG. 11, the social network portal 802 includes a story notification 1102, which displays a story title 1104 and a story digest 1106. In some implementations, the story notification 1102 may also include representations 1108 of user's contact and associated location information 1110 related to the created story.

Figure 12:
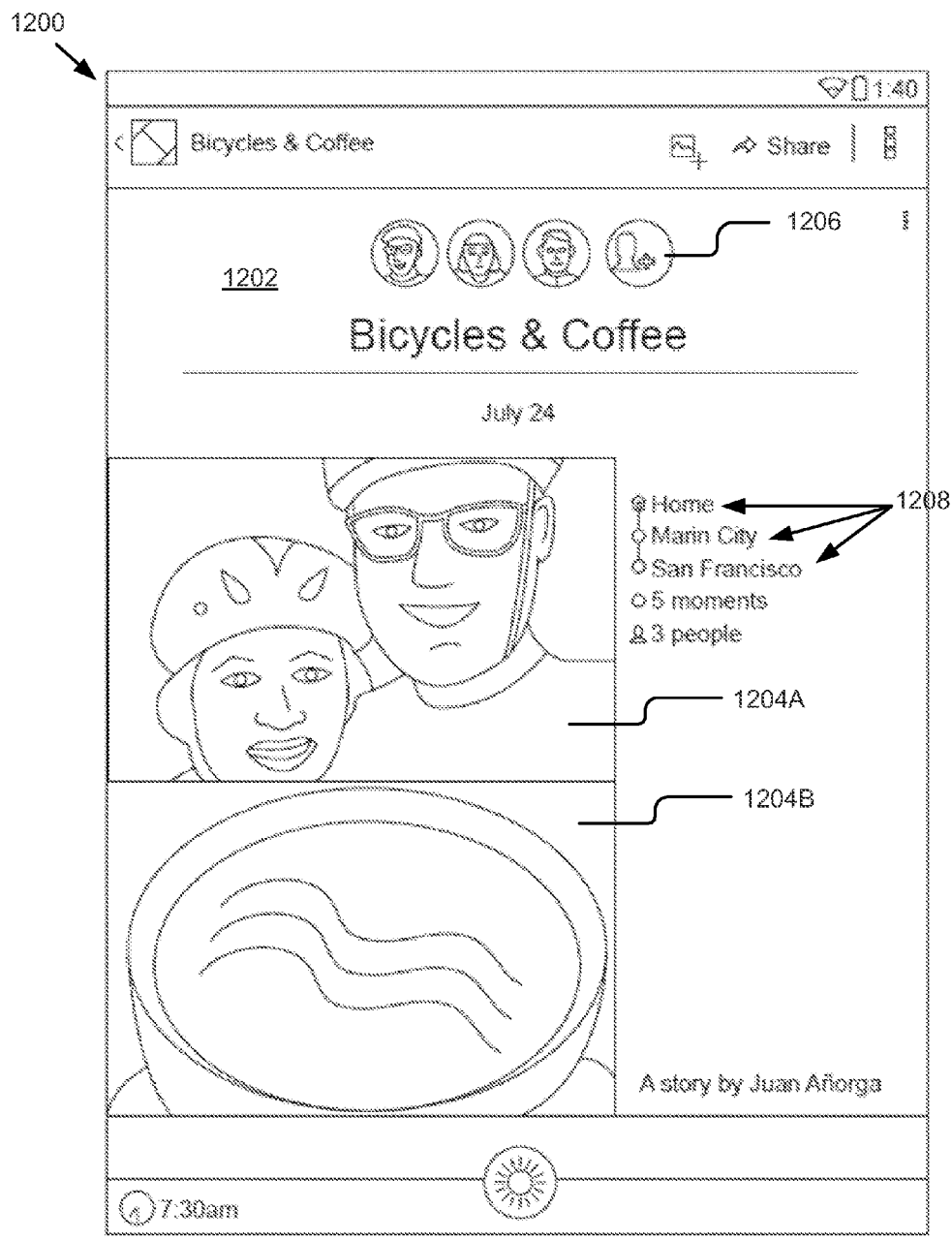
FIG. 12 is a graphic representation of an example user interface of a social network portal displaying an activity summary.

FIG. 12 is a graphic representation of an example user interface 1200 of a social network portal 802 displaying an activity summary 1202. In some implementations, the user interface 1200 may include similar information as user interface 1100. As illustrated in FIG. 12, social network portal 802 includes photos 1204A and 1204B related to the created story, representations 1206 of user's contact and associated location information 1208 related to the created story.

The foregoing description of the implementations of the present disclosure has been presented for the purposes of illustration and description. It is not intended to be exhaustive or to limit the present implementations to the precise form disclosed. Many modifications and variations are possible in light of the above teaching. It is intended that the scope of the present implementations be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present implementations or their features may have different names, divisions and/or formats. Furthermore, as will be apparent to one of ordinary skill in the relevant art, the modules, routines, features, attributes, methodologies and other aspects of the present implementations can be implemented as software, hardware, firmware or any combination of the three. Also, wherever a component, an example of which is a module, of the present implementations are implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present implementations are in no way limited to implementation in any specific programming language, or for any specific operating system or environment. Accordingly, the disclosure is intended to be illustrative, but not limiting, of the scope of the present implementations, which is set forth in the following claims.

What is claimed is:

1. A method comprising:
   receiving user activity information, wherein the user activity information includes content that represents a first type of activity information and a second type of activity information of a user's online activity;
   determining an initiation of a user story of user activities based on a first location of the user;
   generating, using one or more computing devices, a notification of the initiation of the user story for display, the notification including a representation of the first location;
   identifying whether there is a session based on a time frame and relatedness of the user activities to a topic;
   in response to determining the initiation of the user story and the user activities falling within the session,
      categorizing the first type of user activity information and the second type of user activity information into a group of user activity information, the group of user activity information being based on the first location of the user common to the first type of user activity information and the second type of user activity information; and
      updating the notification to indicate that the user story is in progress with progress information associated with the user story, the progressing information including information of an increasing number of the user's contacts that get related to the user story as the user story is progressing;
   determining a change in location of the user activity information to signal an ending of the user story;
   in response to determining the change in location, generating an activity summary for the user, wherein the activity summary includes the content that represents the categorized user activity information based on the first location common to the first type of user activity information and the second type of user activity information; and
   sending, using the one or more computing devices, the activity summary for display.

2. The method of claim 1, further comprising:
   grouping the categorized user activity information in accordance with commonalities.

3. The method of claim 2, further comprising:
   determining a beginning of the grouping.

4. The method of claim 2, further comprising:
   ranking the grouped user activity information according to relevance to the user and/or user's contacts.

5. The method of claim 2, further comprising:
   determining when the group is complete.

6. The method of claim 1, further comprising:
   associating a verb identifier with a user activity; and
   categorizing the first type of user activity information and the second type of user activity information according to the verb identifier.

7. The method of claim 1, wherein the activity summary includes more than one type of user activity.

8. The method of claim 1, further comprising:
   allowing the user to share the generated activity summary with other users.

9. A computer program product comprising a non-transitory computer readable medium encoding instructions that, in response to execution by a computing device, cause the computing device to perform operations comprising:
   receiving user activity information, wherein the user activity information includes content that represents a first type of activity information and a second type of activity information of a user's online activity;
   determining an initiation of a user story of user activities based on a first location of the user;
   generating, using one or more computing devices, a notification of the initiation of the user story for display, the notification including a representation of the first location;
   identifying whether there is a session based on a time frame and relatedness of the user activities to a topic;
   in response to determining the initiation of the user story and the user activities falling within the session,
      categorizing the first type of user activity information and the second type of user activity information into a group of user activity information, the group of user activity information being based on the first location of the user common to the first type of user activity information and the second type of user activity information; and
      updating the notification to indicate that the user story is in progress with progress information associated with the user story, the progressing information including information of an increasing number of the user's contacts that get related to the user story as the user story is progressing;
   determining a change in location of the user activity information to signal an ending of the user story;
   in response to determining the change in location, generating an activity summary for the user, wherein the activity summary includes the content that represents the categorized user activity information based on the first location common to the first type of user activity information and the second type of user activity information; and
   sending, using the one or more computing devices, the activity summary for display.

10. The computer program product of claim 9, wherein the instructions further cause the computing device to further perform:
   grouping the categorized user activity information in accordance with commonalities.

11. The computer program product of claim 10, wherein the instructions further cause the computing device to further perform:
   determining a beginning of the grouping.

12. The computer program product of claim 10, wherein the instructions further cause the computing device to further perform:
  ranking the grouped user activity information according to relevance to the user and/or user's contacts.

13. The computer program product of claim 10, wherein the instructions further cause the computing device to further perform:
  determining when the group is complete.

14. The computer program product of claim 9, wherein the instructions further cause the computing device to further perform:
  associating a verb identifier with a user activity; and
  categorizing the first type of user activity information and the second type of user activity information according to the verb identifier.

15. The computer program product of claim 9, wherein the activity summary includes more than one type of user activity.

16. The computer program product of claim 9, wherein the instructions further cause the computing device to further perform:
  allowing the user to share the generated activity summary with other users.

17. A system comprising:
  one or more processors;
  a user activity information receiver module stored on a non-transitory computer readable medium and executable by the one or more processors, the user activity information receiver module for receiving user activity information, wherein the user activity information includes content that represents a first type of activity information and a second type of activity information of a user's online activity;
  a categorization module stored on the non-transitory computer readable medium and executable by the one or more processors, communicatively coupled to the user activity information receiver module, executable by the one or more processors, for determining an initiation of a user story of user activities based on a first location of the user, for identifying whether there is a session based on a time frame and relatedness of the user activities to a topic, for categorizing, in response to determining the initiation of the user story and the user activities falling within the session, the first type of user activity information and the second type of user activity information into a group of user activity information, the group of user activity information being based on the first location of the user common to the first type of user activity information and the second type of user activity information, and for determining a change in location of the user activity information to signal an ending of the user story;
  in response to determining the change in location, an activity summary generation module stored on the non-transitory computer readable medium and executable by the one or more processors, communicatively coupled to the categorization module, executable by the one or more processors, for generating, using one or more computing devices, a notification of the initiation of the user story for display, wherein the notification includes a representation of the first location of the user, for updating the notification, in response to determining the initiation of the user story and the user activities falling within the session, to indicate that the user story is in progress with progress information associated with the user story, the progressing information including information of an increasing number of the user's contacts that get related to the user story as the user story is progressing, and for generating an activity summary for the user, wherein the activity summary includes the content that represents the categorized user activity information based on the first location common to the first type of user activity information and the second type of user activity information; and
  an output generation module stored on the non-transitory computer readable medium and executable by the one or more processors, communicatively coupled to the activity summary generation module, executable by the one or more processors, for sending, using the one or more computing devices, the activity summary for display.

18. The system of claim 17, wherein the categorization module further groups the categorized user activity information in accordance with commonalities.

19. The system of claim 18, wherein the categorization module further determines a beginning of the grouping.

20. The system of claim 18, wherein the categorization module further ranks the grouped user activity information according to relevance to the user and/or user's contacts.

21. The system of claim 18, wherein the categorization module further determines when the group is complete.

22. The system of claim 17, wherein the categorization module further associates a verb identifier with a user activity, and categorizes the first type of user activity information and the second type of user activity information according to the verb identifier.

23. The system of claim 17, wherein the activity summary includes more than one type of user activity.

24. The system of claim 17, wherein the activity summary generation module allows the user to share the generated activity summary with other users.

* * * * *